April 27, 1926.
H. AUSTIN
HEAD FITTING FOR MOTOR VEHICLES
Filed June 26, 1925
1,582,623
2 Sheets-Sheet 1
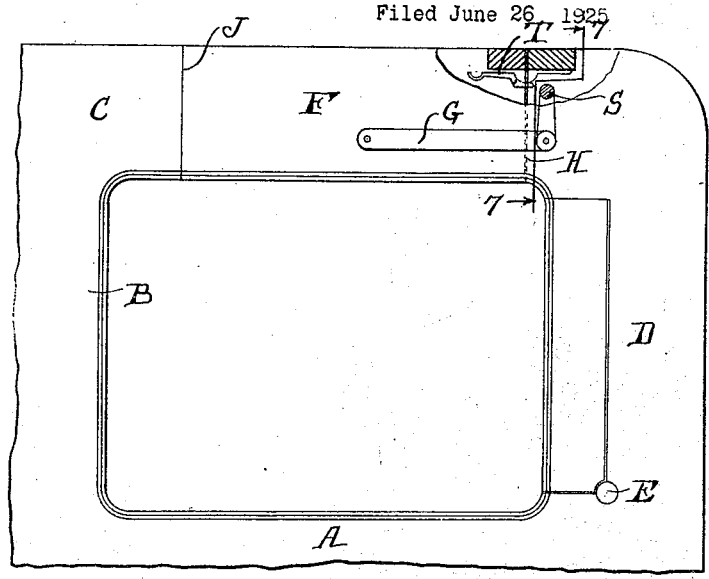
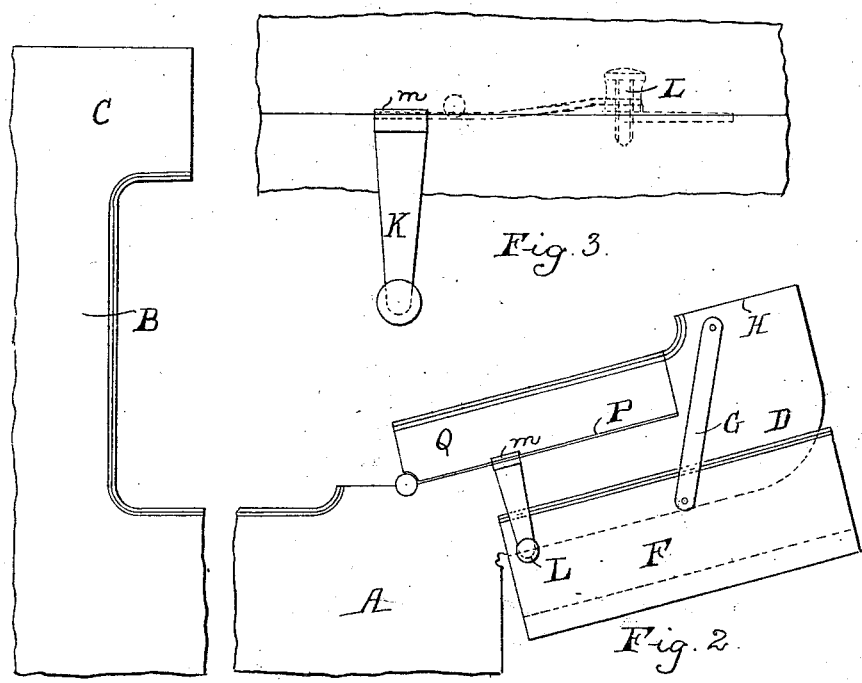
Herbert Austin
By J. Clarkson
Attorney April 27, 1926.

H. AUSTIN

HEAD FITTING FOR MOTOR VEHICLES

Filed June 26, 1925    2 Sheets-Sheet 2

1,582,623

Herbert Austin
By J. H. Clarkson
Attorney

Patented Apr. 27, 1926.

1,582,623

UNITED STATES PATENT OFFICE.

HERBERT AUSTIN, OF BROMSGROVE, ENGLAND.

HEAD FITTING FOR MOTOR VEHICLES.

Application filed June 26, 1925. Serial No. 39,723.

*To all whom it may concern:*

Be it known that I, HERBERT AUSTIN, a subject of the King of Great Britain, and residing at Bromsgrove, in the county of Worcester, England, have invented certain new and useful Improvements in Head Fittings for Motor Vehicles, of which the following is a specification.

This invention relates more especially to the type of vehicle body in which the forward part is permanently covered in while the rear portion is constituted by a collapsible head fitting, as is the case with motor vehicle bodies known as "landaulettes" and "saloon landaulettes", but is also applicable to vehicle bodies in which the whole of the head can be folded down.

Heretofore in vehicles of the landaulette type the rear portion of the head fitting has been formed of a collapsible frame with a flexible covering, but according to one feature of the present invention it is constituted by rigid portions suitably hinged or linked together and one or more to the vehicle body or partly hinged and partly linked. Preferably two such sections are employed, one constituting the upper rear portion of the body and the other a top or roof portion extending, when set up, between the top of the rear section and the back edge of a permanent roof part of the body, or, in cases where there is no permanent forward roof portion, the movable roof portion may connect at its forward end to the screen.

In order that the invention may be clearly understood, a convenient application of the invention to a landaulette is described with reference to the drawings herewith, of which:—

Figure 1 is a view in side elevation of the rear portion of a motor vehicle body arranged according to this invention and showing the body as closed.

Figure 2 is a view corresponding to Figure 1, but showing the head fitting in the open position.

Figure 3 is a detail view to an enlarged scale to illustrate a supporting stay for a part of the head fitting and the means for concealing the support when out of use.

In these drawings:—A is a fixed part of the body of the vehicle, B an upright rigidly fixed in relation thereto and C the rear end of a permanent part of the roof. The back portion D of the body is hinged to turn about a hinge axis E and is linked to a movable roof portion F, by links G. It will be seen that the roof portion F, when set up, abuts at its rear end against a face H of the rear portion D and at its forward end against a face J at the rear end of the permanent roof C.

Figure 4:
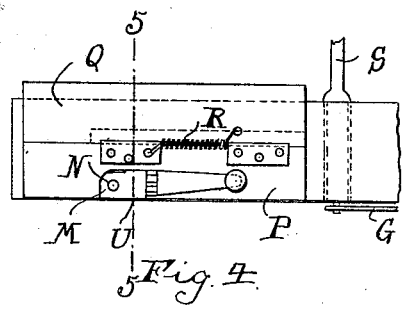
Figure 4 (Sheet 2) is a view to illustrate in plan the housing of the stay and also a further detail of the construction.
Figure 6:
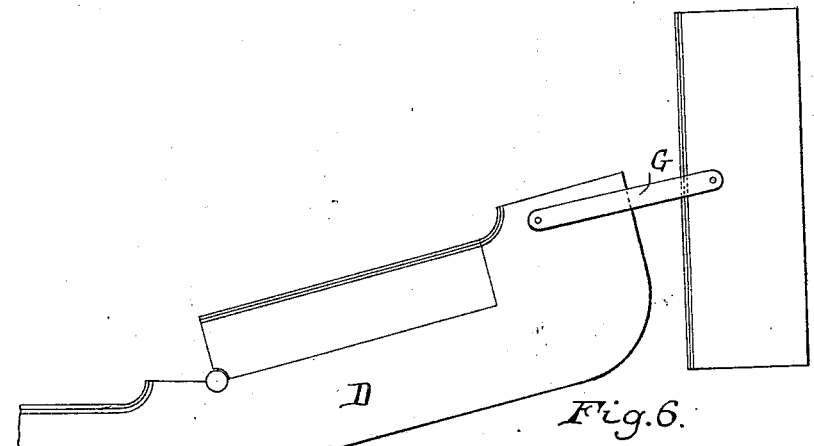
Figure 7:
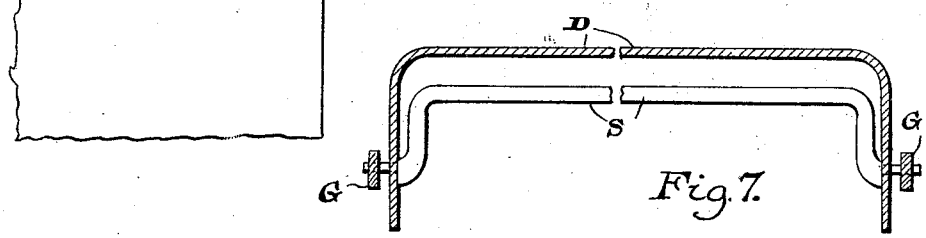
Figure 7 is a cross section on the line 7—7 of Figure 1.
Figure 5:
Figure 5 is a section taken in the plane indicated by the line 5, 5, of Figure 4 but showing the flap closed; and, Figure 6 is a view corresponding somewhat to Figure 2; but showing the head fitting as partially folded down.

When the head fitting is folded down, the rear portion D is folded back to the position shown in Figures 2 and 6 and the portion F is swung round on the links G until it lies underneath the portion D as clearly shown in Figure 2 and is reversed end for end. What is then the forward end of the portion F is supported by two stays K secured at their lower ends to the portion F by means of thumb screws L, and each at its upper end is hinged to a bracket M which is secured to the portion D by a pivot axis N (see Figure 4). The stay K, when out of use, is hinged up and swung round through a quarter turn so as to lie upon a face P of the portion D, such face being normally covered by a hinged flap Q which carries one of the window guides. The flap Q is suitably recessed on its inner face to receive the stay K and screw L and is held in its closed position by means of a coil spring R (see Figure 4). The two links G are coupled across by means of a torsion bar S (see Figures 1 and 4) to ensure that the links move in unison and thus facilitate the setting up and folding down of the head fitting. The bar S is cranked at its two ends so that it may lie closely against the roof. The movable roof portion F is secured in relation to the two portions C and D by suitable clamping devices one of which is shown at T in Figure 1.

It will now be understood that the head fitting, when set up, has substantially the same appearance and rigidity as a body which is permanently closed. The stay K is entirely concealed except for a small portion U see Figure 4 which may be made to conform with the beading of the body, and the link G may be rendered inconspicuous by making it also appear as a part of the beading.

Having fully described my invention what I claim and desire to secure by Letters Patent is:—

1. A head fitting for a vehicle body comprising a rigid vertical portion hinged at its lower end to the vehicle body, a rigid roof portion extending horizontally from the top of the vertical portion, a pair of links connecting the top of the vertical rigid portion with points along the side edges of the roof portion and intermediate the ends thereof, a stay to support the roof portion when folded down and a plate swivelled to the said vertical portion and hinged to the stay in such a way that the stay can be folded up against the said vertical portion when out of use.

2. A head fitting for a vehicle body comprising a rigid vertical portion hinged at its lower end to the vehicle body, a rigid roof portion extending horizontally from the top of the vertical portion, a pair of links connecting the top of the vertical rigid portion with points along the side edges of the horizontal portion and intermediate the ends thereof, a stay to support the roof portion when folded down a plate swivelled to the said vertical portion and hinged to the stay in such a way that the stay can be folded up against the said vertical portion when out of use, and a hinged flap of the vertical portion which folds over the said stay and conceals it when out of use.

In witness whereof I have hereunto signed my name this 9th day of June, 1925.

HERBERT AUSTIN.